United States Patent
Yang

(10) Patent No.: US 10,866,770 B2
(45) Date of Patent: Dec. 15, 2020

(54) PRINTING SYSTEM, HOST APPARATUS, PRINTING CONTROL METHOD, AND PROGRAM

(71) Applicant: Seiko Instruments Inc., Chiba (JP)

(72) Inventor: Dong Yang, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 16/707,438

(22) Filed: Dec. 9, 2019

(65) Prior Publication Data
US 2020/0210118 A1 Jul. 2, 2020

(30) Foreign Application Priority Data
Dec. 27, 2018 (JP) ................. 2018-244549

(51) Int. Cl.
*G06F 3/12* (2006.01)

(52) U.S. Cl.
CPC .......... *G06F 3/1218* (2013.01); *G06F 3/1234* (2013.01); *G06F 3/1259* (2013.01)

(58) Field of Classification Search
CPC ..... G06F 3/1218; G06F 3/1234; G06F 3/1259
See application file for complete search history.

(56) References Cited

U.S. PATENT DOCUMENTS

| | | | | |
|---|---|---|---|---|
| 4,745,602 A | * | 5/1988 | Morrell | G06F 11/0733 714/2 |
| 5,507,003 A | * | 4/1996 | Pipkins | G06F 13/4226 710/31 |
| 6,029,238 A | * | 2/2000 | Furukawa | G06F 3/1204 358/1.15 |
| 6,198,985 B1 | | 3/2001 | Miyasaka et al. | |
| 6,450,605 B1 | * | 9/2002 | Walmsley | B41J 2/0458 347/12 |

(Continued)

FOREIGN PATENT DOCUMENTS

| | | |
|---|---|---|
| JP | H09-114608 A | 5/1997 |
| JP | 2000-322208 A | 11/2000 |

OTHER PUBLICATIONS

Extended European Search Report for Europe Application No. 19219646.7, dated May 28, 2020, 9 pages.

*Primary Examiner* — Ted W Barnes
(74) *Attorney, Agent, or Firm* — Brinks Gilson & Lione

(57) ABSTRACT

A printing system includes a host apparatus configured to transmit a command to a printer apparatus. The host apparatus includes a communicator configured to receive status information containing information indicating a status of the printer apparatus, which is transmitted by the printer apparatus; a monitor configured to monitor the status of the printer apparatus based on the information indicating the status of the printer apparatus, which is contained in the status information received by the communicator; a determiner configured to determine, based on a result of monitoring the printer apparatus by the monitor, whether a reset command to be transmitted to the printer apparatus is to be generated; and a generator configured to generate the reset command when the determiner determines that the reset command is to be generated. The communicator is configured to transmit the reset command generated by the generator to the printer apparatus.

12 Claims, 8 Drawing Sheets

(56) References Cited

U.S. PATENT DOCUMENTS

| | | | | |
|---|---|---|---|---|
| 6,572,288 | B1* | 6/2003 | Funahashi | G06F 3/1204 400/61 |
| 2001/0024585 | A1* | 9/2001 | Koakutsu | B41J 2/17566 400/76 |
| 2001/0043723 | A1* | 11/2001 | Kadota | G06F 3/121 382/113 |
| 2004/0036911 | A1* | 2/2004 | Saida | G06F 3/1247 358/1.15 |
| 2004/0051898 | A1* | 3/2004 | Tuchitoi | G06F 3/1274 358/1.14 |
| 2006/0132866 | A1* | 6/2006 | Okamoto | G06F 3/1234 358/502 |
| 2013/0155458 | A1* | 6/2013 | Kanakubo | G06F 3/1229 358/1.15 |
| 2018/0352591 | A1* | 12/2018 | Maki | H04W 76/11 |

* cited by examiner

RESET DETERMINATION INFORMATION 213

| STATUS OF PRINTER APPARATUS | RECOVERABLE ERROR | | UNRECOVERABLE ERROR | RESET COMMAND |
|---|---|---|---|---|
| | MANUALLY RECOVERABLE | AUTOMATICALLY RECOVERABLE | | |
| PRINTING | DETECTED | - | - | GENERATE |
| PRINTING | - | DETECTED | - | DO NOT GENERATE |
| PRINTING | - | - | DETECTED | DO NOT GENERATE |
| NOT PRINTING | DETECTED | - | - | DO NOT GENERATE |
| NOT PRINTING | - | DETECTED | - | DO NOT GENERATE |
| NOT PRINTING | - | - | DETECTED | DO NOT GENERATE |
| NOT PRINTING | - | - | - | DO NOT GENERATE |

FIG.2

PRINTING SYSTEM, HOST APPARATUS, PRINTING CONTROL METHOD, AND PROGRAM

RELATED APPLICATIONS

This application claims priority to Japanese Patent Application No. 2018-244549 filed on Dec. 27, 2018, the entire content of which is incorporated herein by reference.

BACKGROUND OF THE INVENTION

1. Field of the Invention

The present invention relates to a printing system, a host apparatus, a printing control method, and a program.

2. Description of the Related Art

In a printing system including a printer apparatus configured to execute print processing and a host apparatus configured to transmit a command to the printer apparatus, when the print processing is interrupted for some reason, for example, a cover of the printer apparatus being opened while the printer apparatus is executing print processing, unprocessed print data may remain in a buffer of the printer apparatus. The print data remaining in the buffer is data that is not required, namely, garbage data, and when such data is not deleted, the data is printed after the printer apparatus has recovered from a state in which print processing is interrupted to a printable state. For this reason, wasteful printed matter is created. In order to prevent wasteful printing from being executed, it is required for an operator to discard the data that remains in the buffer and is not required by operating an operation panel to cancel printing.

There has been known a printing system employing a technology in which wasteful usage of paper and toner are eliminated by eliminating wasteful printing. In the technology, a personal computer includes a user command input apparatus configured to input a command for instructing a laser printer to discard print data, and a Centronics port configured to immediately transmit the input command to a printing apparatus. The laser printer includes a CPU configured to discard all unprinted print data in the printing apparatus when the received command is a discard command.

In the case of causing a printer apparatus to discard unnecessary data remaining in the buffer by canceling printing through the operation of the operation panel, the operator is burdened with the time and effort to perform the operation. In a case in which an error has occurred in the printer apparatus, when a command to discard the print data is transmitted from the host apparatus to the printer apparatus, wasteful processing of discarding data is performed even when there is no unnecessary data remaining in the buffer, and hence power consumption is increased.

In view of such circumstances, in this technical field, there have been demands for a printing system, a host apparatus, a printing control method, and a program that are capable of resetting a printing apparatus based on a status of the printer apparatus without involving operation by the operator.

SUMMARY OF THE INVENTION

According to one embodiment of the present invention, there is provided a printing system, including a host apparatus configured to transmit a command to a printer apparatus, the host apparatus including a communicator configured to receive status information containing information indicating a status of the printer apparatus, which is transmitted by the printer apparatus; a monitor configured to monitor the status of the printer apparatus based on the information indicating the status of the printer apparatus, which is contained in the status information received by the communicator; a determiner configured to determine, based on a result of monitoring the printer apparatus by the monitor, whether a reset command to be transmitted to the printer apparatus is to be generated; and a generator configured to generate the reset command when the determiner determines that the reset command is to be generated, the communicator being configured to transmit the reset command generated by the generator to the printer apparatus.

In the above-mentioned printing system according to the one embodiment, wherein the status information contains information indicating that the printer apparatus is printing and information indicating that the printer apparatus is unable to print.

In the above-mentioned printing system according to the one embodiment, wherein when the monitor determines that the printer apparatus is printing, the determiner determines that the reset command is to be generated when the information indicating the status of the printer apparatus indicates that the printer apparatus is unable to print but is manually recoverable.

In the above-mentioned printing system according to the one embodiment, wherein when the monitor determines that the printer apparatus is not printing, the determiner determines that the reset command is not to be generated when the information indicating the status of the printer apparatus indicates that the printer apparatus is unable to print.

In the above-mentioned printing system according to the one embodiment, the printing system further including a storage configured to store pieces of print data to be transmitted to the printer apparatus; and a printing controller configured to retransmit, when the printer apparatus that has been reset based on the reset command transmitted to the printer apparatus has recovered to a printable state, among the pieces of print data stored in the storage, a piece of print data which has been transmitted to the printer apparatus and for which printing by the printer apparatus is incomplete.

In the above-mentioned printing system according to the one embodiment, wherein the communicator is wirelessly connected to the printer apparatus.

According to one embodiment of the present invention, there is provided a host apparatus which is configured to transmit a command to a printer apparatus, the host apparatus including a communicator configured to receive status information containing information indicating a status of the printer apparatus, which is transmitted by the printer apparatus; a monitor configured to monitor the status of the printer apparatus based on the information indicating the status of the printer apparatus, which is included in the status information received by the communicator; a determiner configured to determine, based on a result of monitoring the printer apparatus by the monitor, whether a reset command to be transmitted to the printer apparatus is to be generated; and a generator configured to generate the reset command when the determiner determines that the reset command is to be generated, the communicator being configured to transmit the reset command generated by the generator to the printer apparatus.

According to one embodiment of the present invention, there is provided a printing control method to be executed by a printing system including a host apparatus configured to transmit a command to a printer apparatus, the method including receiving, by the host apparatus, status information containing information indicating a status of the printer apparatus, which is transmitted by the printer apparatus; monitoring, by the host apparatus, the status of the printer apparatus based on the information indicating the status of the printer apparatus, which is included in the status information received in the receiving; determining, by the host apparatus, based on a result of monitoring the printer apparatus in the monitoring, whether a reset command to be transmitted to the printer apparatus is to be generated; and generating, by the host apparatus, the reset command when it is determined in the determining that the reset command is to be generated; and transmitting the reset command generated in the generating to the printer apparatus.

According to one embodiment of the present invention, there is provided a program for causing a computer of a host apparatus, which is configured to transmit a command to a printer apparatus, to execute receiving status information containing information indicating a status of the printer apparatus, which is transmitted by the printer apparatus; monitoring the status of the printer apparatus based on the information indicating the status of the printer apparatus, which is included in the status information received in the receiving; determining based on a result of monitoring the printer apparatus in the monitoring, whether a reset command to be transmitted to the printer apparatus is to be generated; and generating the reset command when it is determined in the determining that the reset command is to be generated; and transmitting the reset command generated in the generating to the printer apparatus.

BRIEF DESCRIPTION OF THE DRAWINGS

FIG. 2 is a table for showing an example of reset determination information.

DETAILED DESCRIPTION OF THE PREFERRED EMBODIMENTS

Now, a printing system, a host apparatus, a printing control method, and a program according to at least one embodiment of the present invention are described with reference to the accompanying drawings. At least one embodiment of the present invention described below is merely an example, and embodiments to which the present invention is applicable are not limited to the following at least one embodiment. Further, an expression "based on XX" in the present application means "based on at least XX", and includes cases based on another element in addition to "XX". In addition, the expression "based on XX" is not limited to cases in which "XX" is directly used, and also includes cases based on performing calculation or processing on "XX". "XX" may be any element (e.g., any information).

Figure 1:
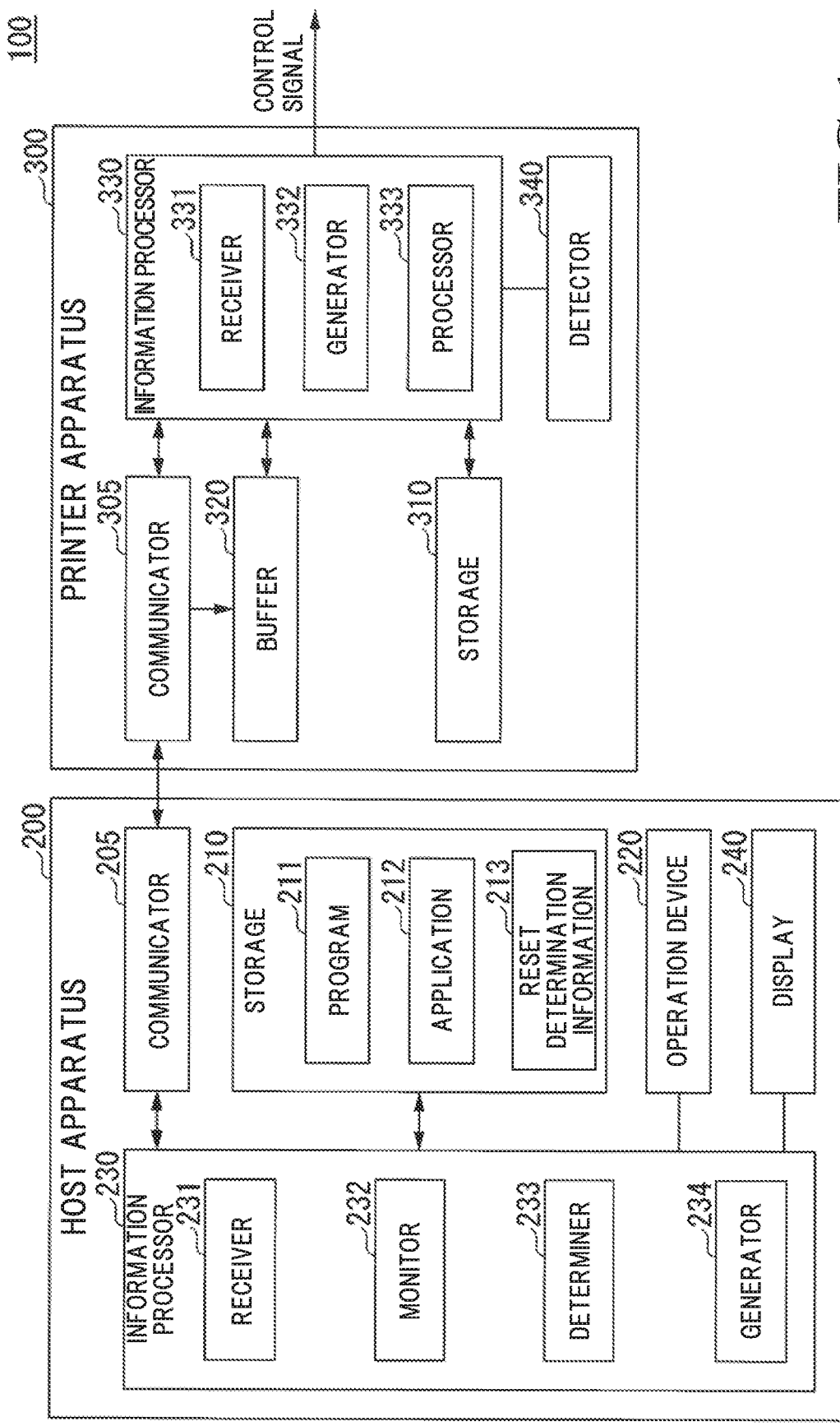
FIG. 1 is a block diagram for illustrating an example of a configuration of a printing system according to at least one embodiment of the present invention.

Now, at least one embodiment of the present invention is described with reference to the accompanying drawings. FIG. 1 is a block diagram for illustrating an example of a configuration of a printing system according to at least one embodiment. As illustrated in FIG. 1, a printing system 100 includes a host apparatus 200 configured to transmit a command to a printer apparatus 300, and the printer apparatus 300 configured to receive the command transmitted by the host apparatus 200 to perform processing based on the received command. The command may be, for example, a reset command for resetting (restarting) the printer apparatus 300 after the printer apparatus 300 receives the command. The host apparatus 200 and the printer apparatus 300 forming the printing system 100 are now described in that order.

The host apparatus 200 includes a communicator 205, a storage 210, an operation device 220, an information processor 230, and a display 240. The communicator 205 is implemented by a communication module. Specifically, the communicator 205 is built from a wireless device configured to perform wireless communication by using a wireless communication technology, for example, a wireless LAN (trademark). The communicator 205 may also be built from a device configured to perform wired communication. In this example, there is described a case in which the communicator 205 is built from a wireless device configured to perform wireless communication by using wireless communication technology. The communicator 205 communicates to and from an external communication apparatus, for example, the printer apparatus 300, via a network. Specifically, the communicator 205 is configured to receive status information transmitted by the printer apparatus 300 to output the received status information to the information processor 230. The status information is information for notifying of the status of the printer apparatus 300. The communicator 205 also acquires print data output by the information processor 230 and transmits the acquired print data to the printer apparatus 300. The communicator 205 also acquires commands output by the information processor 230 and transmits the acquired commands to the printer apparatus 300.

The storage 210 is implemented by, for example, a random-access memory (RAM), a read-only memory (ROM), a hard disk drive (HDD), a flash memory, or a hybrid storage device in which a plurality of those are combined. The storage 210 is configured to store a program 211 and an application 212 to be executed by the information processor 230. The storage 210 also stores reset determination information 213. The program 211 is, for example, an operating system, and is located between the user or an application program and the hardware. The program 211 provides a standard interface for the user and application programs, and at the same time, efficiently manages various resources including the hardware. The application 212 causes the host apparatus 200 to receive status information transmitted by the printer apparatus 300. The application 212 causes the host apparatus 200 to acquire information indicating the status of the printer apparatus 300 included in the received status information, and monitor the status of the printer apparatus 300 based on the acquired information indicating the status of the printer apparatus 300. The application 212 causes the host apparatus 200 to determine, based on the result of monitoring the printer apparatus 300, whether or not to generate a reset command for the printer apparatus 300. The application 212 causes the host apparatus 200 to generate the reset command for the printer apparatus 300 when it is determined that the reset command is to be generated. The application 212 causes the host apparatus 200 to transmit the generated reset command to the printer apparatus 300.

The reset determination information 213 is used when the host apparatus 200 determines whether or not to generate the reset command based on information indicating the status of the printer apparatus 300 included in the status information transmitted by the printer apparatus 300. FIG. 2 is a table for showing an example of the reset determination information. The reset determination information 213 is information having a table format, which associates information indicating the status of the printer apparatus 300, information indicating whether or not a recoverable error has been detected, information indicating whether or not an unrecoverable error has been detected, and information indicating whether or not to generate a reset command. When a recoverable error occurs, the printer apparatus 300 stops printing and enters a state in which the printer apparatus 300 cannot continue printing, but there is a possibility that the printer apparatus 300 may recover to a printable state. When a recoverable error occurs, print data may accumulate in a print buffer of the printer apparatus 300. When an unrecoverable error occurs, the printer apparatus 300 stops printing, enters a state in which the printer apparatus 300 cannot continue printing, and cannot recover to a printable state. An unrecoverable error may cause print data to accumulate in the print buffer of the printer apparatus 300. A recoverable error is classified into one of a manually recoverable error and an automatically recoverable error. When a manually recoverable error occurs, the printer apparatus 300 stops printing and enters a state in which the printer apparatus 300 cannot continue printing, but may manually recover to a printable state. When a manually recoverable error occurs, print data may accumulate in the print buffer of the printer apparatus 300. There are two types of automatically recoverable errors, namely, errors in which the printer apparatus 300 is immediately and automatically recoverable to a printable state, and errors in which the printer apparatus 300 remains in an error state for some time. The automatically recoverable error described here is the type in which the printer apparatus 300 can immediately and automatically recover to a printable state. An automatically recoverable error is an error in which the printer apparatus 300 can recover without outside interference. Thus, when an automatically recoverable error occurs, even when print data has temporarily accumulated in the print buffer of the printer apparatus 300, the printer apparatus 300 can continue printing and print data does not accumulate in the print buffer of the printer apparatus 300 when the printer apparatus 300 can automatically recover from the error state to a printable state. As shown in FIG. 2, the host apparatus 200 generates a reset command when a manually recoverable error is detected while the printer apparatus 300 is in a printing state. The host apparatus 200 does not generate a reset command when an automatically recoverable error is detected while the printer apparatus 300 is in a printing state. The host apparatus 200 does not generate a reset command when an unrecoverable error is detected while the printer apparatus 300 is in a printing state. The host apparatus 200 does not generate a reset command when none of a recoverable error (manually recoverable error and automatically recoverable error) and an unrecoverable error is detected while the printer apparatus 300 is in a printing state. The host apparatus 200 does not generate a reset command when a manually recoverable error is detected while the printer apparatus 300 is not in a printing state. The host apparatus 200 does not generate a reset command when an automatically recoverable error is detected while the printer apparatus 300 is not in a printing state. The host apparatus 200 does not generate a reset command when an unrecoverable error is detected while the printer apparatus 300 is not in a printing state. The host apparatus 200 does not generate a reset command when none of a recoverable error (manually recoverable error and automatically recoverable error) and an unrecoverable error is detected while the printer apparatus 300 is not in a printing state. Returning to FIG. 1, the operation device 220 is a user interface, and includes an input device and an output device. The input device is, for example, key buttons or a touch panel. The key buttons are a start key, a stop key, a numeric keypad, a clear key, a reset key, and the like. The start key is a key button for starting a printing operation. The stop key is a key button for halting the printing operation. The numeric keypad includes key buttons for setting numerical values and the like. In at least one embodiment, the output device is the display 240. The display 240 functions as a touch panel in addition to displaying images. The display 240 is configured to display a setting screen during print processing. From the setting screen, the user can perform settings such as size change and density setting through the touch panel function of the display 240 and the operation of key buttons.

All or a part of the information processor 230 is a function unit (hereinafter referred to as a "software function unit") implemented by, for example, a processor such as a central processing unit (CPU) executing the program 211 and the application 212 stored in the storage 210. All or a part of the information processor 230 may also be implemented by hardware such as a large scale integration (LSI) device, an application-specific integrated circuit (ASIC), or a field-programmable gate array (FPGA), or may be implemented by a combination of the software function unit and the hardware. The information processor 230 includes, for example, a receiver 231, a monitor 232, a determiner 233, and a generator 234.

The receiver 231 is configured to acquire the status information output by the communicator 205 to acquire information indicating the status of the printer apparatus 300 included in the acquired status information. The receiver 231 outputs the acquired information indicating the status of the printer apparatus 300 to the monitor 232. The monitor 232 is configured to monitor the status of the printer apparatus 300 based on the information indicating the status of the printer apparatus 300 output by the receiver 231. Specifically, the monitor 232 monitors whether or not the printer apparatus 300 is printing based on the information indicating the status of the printer apparatus 300. The monitor 232 determines, based on the information indicating the status of the printer apparatus 300, whether or not the printer apparatus 300 is unable to continue printing. Specifically, the monitor 232 determines whether a manually recoverable error or an automatically recoverable error has occurred in the printer apparatus 300 based on the information indicating the status of the printer apparatus 300. The monitor 232 determines whether or not an unrecoverable error has occurred in the printer apparatus 300 based on the information indicating the status of the printer apparatus 300. The monitor 232 outputs to the determiner 233 information indicating whether or not the printer apparatus 300 is printing, information indicating whether or not the printer apparatus 300 is unable to continue printing, and information indicating whether or not an unrecoverable error has occurred in the printer apparatus 300. The information indicating whether or not the printer apparatus 300 is unable to continue printing includes information indicating whether a manually recoverable error or an automatically recoverable error has occurred in the printer apparatus 300. For example, the monitor 232 determines that a manually recoverable error has occurred in the printer apparatus 300 when the information indicating the status of the printer apparatus 300 indicates any of an out-of-paper error, a cover-open error, or a cutter error. The out-of-paper error is information indicating the status of the printer apparatus 300 included in the status information to be transmitted when the printer apparatus 300 detects that there is no thermal paper. The cover-open error is information indicating the status of the printer apparatus 300 included in the status information to be transmitted when the printer apparatus 300 detects that the paper cover is in an open state. The cutter error is information indicating the status of the printer apparatus 300 included in the status information to be transmitted when the printer apparatus 300 detects that a cutting defect state has occurred. The cutting defect state occurs when a paper jam or the like occurs during cutting. The monitor 232 determines that an automatically recoverable error has occurred in the printer apparatus 300 when the information indicating the status of the printer apparatus 300 indicates any of a voltage error, a head temperature error, and output buffer full. The voltage error is information indicating the status of the printer apparatus 300 included in the status information to be transmitted when the printer apparatus 300 detects that the power supply voltage is outside an allowable range. The printer apparatus 300 automatically recovers when the power supply voltage returns to the allowable range, and therefore the monitor 232 determines that the voltage error is an automatically recoverable error that has occurred in the printer apparatus 300. The head temperature error is information indicating the status of the printer apparatus 300 included in the status information to be transmitted when the printer apparatus 300 detects that the head temperature has risen to be equal to or higher than an allowable temperature. The printer apparatus 300 automatically recovers when the head temperature returns to the allowable range, and therefore the monitor 232 determines that the head temperature error is an automatically recoverable error that has occurred in the printer apparatus 300. The buffer full is information indicating the status of the printer apparatus 300 included in the status information to be transmitted when the printer apparatus 300 detects that the print data is full in the buffer. The full state of the buffer is released by a reply transmitted by the host apparatus 200 in response to the status information, and therefore the monitor 232 determines that the buffer full is an automatically recoverable error that has occurred in the printer apparatus 300. The monitor 232 determines that an unrecoverable error has occurred in the printer apparatus 300 when the information indicating the status of the printer apparatus 300 indicates a hardware error. When an unrecoverable error occurs, because the error is unrecoverable, the printer apparatus 300 may require repair. The hardware error may be information indicating the status of the printer apparatus 300 included in the status information to be transmitted when the printer apparatus 300 detects that an abnormality has occurred in any one of or both of the thermal head and the circuit board. The hardware error may be information indicating the status of the printer apparatus 300 included in the status information to be transmitted when the printer apparatus 300 detects an error in the initial power supply.

The determiner 233 is configured to acquire any of information indicating whether or not the printer apparatus 300 is printing, information indicating whether or not the printer apparatus 300 is not able to continue printing, and information indicating whether or not an unrecoverable error has occurred in the printer apparatus 300, which are output by the monitor 232, to determine whether or not to generate the reset command based on the acquired any of the information indicating whether or not the printer apparatus 300 is printing, the information indicating whether or not the printer apparatus 300 is not able to continue printing, and the information indicating whether or not an unrecoverable error has occurred in the printer apparatus 300. The determiner 233 outputs to the generator 234 the determination result as to whether or not the reset command is to be generated. Specifically, the determiner 233 refers to the reset determination information 213 stored in the storage 210 and performs the following determination. The determiner 233 acquires information indicating whether a manually recoverable error or an automatically recoverable error has occurred in the printer apparatus 300 from the information indicating whether or not the printer apparatus 300 is unable to continue printing. When information indicating that the printer apparatus 300 is printing and information indicating that a manually recoverable error has occurred in the printer apparatus 300 are acquired, the determiner 233 determines that the reset command is to be generated. When information indicating that the printer apparatus 300 is printing and information indicating that an automatically recoverable error has occurred in the printer apparatus 300 are acquired, the determiner 233 determines that the reset command is not to be generated. When information indicating that the printer apparatus 300 is printing and information indicating that an unrecoverable error has occurred in the printer apparatus 300 are acquired, the determiner 233 determines that the reset command is not to be generated. When information indicating that the printer apparatus 300 is printing is acquired, but none of information indicating whether a manually recoverable error or an automatically recoverable error has occurred in the printer apparatus 300 and information indicating whether or not an unrecoverable error has occurred in the printer apparatus 300 is acquired, the determiner 233 determines that the reset command is not to be generated. When information indicating that the printer apparatus 300 is not printing and information indicating that a manually recoverable error has occurred in the printer apparatus 300 are acquired, the determiner 233 determines that the reset command is not to be generated. When information indicating that the printer apparatus 300 is not printing and information indicating that an automatically recoverable error has occurred in the printer apparatus 300 are acquired, the determiner 233 determines that the reset command is not to be generated. When information indicating that the printer apparatus 300 is not printing and information indicating that an unrecoverable error has occurred in the printer apparatus 300 are acquired, the determiner 233 determines that the reset command is not to be generated. When information indicating that the printer apparatus 300 is not printing is acquired, but none of information indicating whether a manually recoverable error or an automatically recoverable error has occurred in the printer apparatus 300 and information indicating that an unrecoverable error has occurred in the printer apparatus 300 is acquired, the determiner 233 determines that the reset command is not to be generated.

The generator 234 is configured to generate print data to output the generated print data to the communicator 205. The generator 234 acquires the determination result output by the determiner 233 as to whether or not the reset command is to be generated, and generates the reset command depending on the acquired determination result as to whether or not the reset command is to be generated. Specifically, the generator 234 generates the reset command when the determination result as to whether or not the reset command is to be generated indicates that the reset command is to be generated, and does not generate the reset command when the determination result as to whether or not the reset command is to be generated indicates that the reset command is not to be generated. When the generator 234 is to generate the reset command, the generator 234 outputs the generated reset command to the communicator 205.

The printer apparatus 300 includes a communicator 305, a storage 310, a buffer 320, an information processor 330, and a detector 340. The communicator 305 is implemented by a communication module. Specifically, the communicator 305 is built from a wireless device configured to perform wireless communication by using a wireless communication technology, for example, a wireless LAN (trademark). The communicator 305 may also be built from a device configured to perform wired communication. In this example, there is described a case in which the communicator 305 is built from a wireless device configured to perform wireless communication by using wireless communication technology. The communicator 305 communicates to and from an external communication apparatus, for example, the host apparatus 200, via a network. Specifically, the communicator 305 is configured to acquire the status information output by the information processor 330, and transmit the acquired status information to the host apparatus 200. The communicator 305 also receives print data transmitted by the host apparatus 200 and outputs the received print data to the buffer 320. The communicator 305 also receives commands transmitted by the host apparatus 200 and outputs the received commands to the information processor 330.

The storage 310 is implemented by, for example, a RAM, a ROM, an HDD, a flash memory, or a hybrid storage device in which a plurality of those are combined. The storage 310 is configured to store a control program for causing the printer apparatus 300 to execute printing. The control program causes the printer apparatus 300 to detect the status of the printer apparatus 300 and create information indicating the status of the printer apparatus 300 based on the detection result of the status of the printer apparatus 300. The control program causes the printer apparatus 300 to create status information containing the created information indicating the status of the printer apparatus 300, and transmit the created status information to the host apparatus 200. The control program causes the printer apparatus 300 to receive a command transmitted by the host apparatus 200 and execute processing based on the received command. The control program causes the printer apparatus 300 to receive print data transmitted by the host apparatus 200 and execute print processing based on a received print command. The buffer 320 is implemented by, for example, a RAM, an HDD, a flash memory, or a hybrid storage device in which a plurality of those are combined. The buffer 320 is configured to acquire print data output by the communicator 305, and temporarily store the acquired print data.

All or a part of the information processor 330 is a software function unit implemented by, for example, a processor such as a CPU executing a control program stored in the storage 310. All or a part of the information processor 330 may also be implemented by hardware such as an LSI device, an ASIC, or an FPGA, or may be implemented by a combination of the software function unit and the hardware. The information processor 330 includes, for example, a receiver 331, a generator 332, and a processor 333.

The receiver 331 is configured to acquire commands output by the communicator 205 to output the acquired commands to the processor 333. The generator 332 is configured to generate, based on detection information output by the detector 340, information indicating the status of the printer apparatus 300 and status information containing the created information indicating the status of the printer apparatus 300. The generator 332 outputs the generated status information to the communicator 305. Specifically, when the detector 340 outputs detection information indicating that the printer apparatus 300 is to start printing, the generator 332 generates information indicating the status of the printer apparatus 300 based on the detection information indicating that printing is to start, which is output by the detector 340. Further, when the detector 340 outputs detection information indicating that the printer apparatus 300 has detected an out-of-paper error, the generator 332 generates information indicating the status of the printer apparatus 300 based on the detection information indicating that the out-of-paper error output by the detector 340 has been detected. When the detector 340 outputs detection information indicating that the printer apparatus 300 has detected a cover-open error, the generator 332 generates information indicating the status of the printer apparatus 300 based on the detection information indicating that the cover-open error output by the detector 340 has been detected. When the detector 340 outputs detection information indicating that the printer apparatus 300 has detected a cutter error, the generator 332 generates information indicating the status of the printer apparatus 300 based on the detection information indicating that the cutter error output by the detector 340 has been detected. When the detector 340 outputs detection information indicating that the printer apparatus 300 has detected a hardware error, the generator 332 generates information indicating the status of the printer apparatus 300 based on the detection information indicating that the hardware error output by the detector 340 has been detected. When the detector 340 outputs detection information indicating that the printer apparatus 300 has detected a voltage error, the generator 332 generates information indicating the status of the printer apparatus 300 based on the detection information indicating that the voltage error output by the detector 340 has been detected. When the detector 340 outputs detection information indicating that the printer apparatus 300 has detected a head temperature error, the generator 332 generates information indicating the status of the printer apparatus 300 based on the detection information indicating that the head temperature error output by the detector 340 has been detected. When the detector 340 outputs detection information indicating that the printer apparatus 300 has detected that the output buffer is full, the generator 332 generates information indicating the status of the printer apparatus 300 based on the detection information indicating that the output buffer full output by the detector 340 has been detected. The processor 333 is configured to acquire the print data stored in the buffer 320 to output a control signal for causing the thermal heads to print and a control signal for driving a stepping motor based on the acquired print data. The thermal heads and the stepping motor are configured to operate in accordance with the control signal for causing the thermal heads to print and the control signal for driving the stepping motor, which are output by the processor 333. The processor 333 acquires commands output by the receiver 331, and performs processing based on the acquired commands. Specifically, the processor 333 resets (restarts) the printer apparatus 300 when a command output by the receiver 331 is a reset command.

The detector 340 detects the status of the printer apparatus 300. Specifically, the detector 340 detects that printing is to start, and based on the detection that printing is to start, generates detection information indicating that printing is to start. The detector 340 outputs to the generator 332 the generated detection information indicating that printing is to start. Further, the detector 340 detects an out-of-paper error, and based on the detection of the out-of-paper error, generates detection information indicating that the out-of-paper error has been detected. The detector 340 outputs to the generator 332 the generated detection information indicating that the out-of-paper error has been detected. The detector 340 also detects a cover-open error, and based on the detection of the cover-open error, generates detection information indicating that the cover-open error has been detected. The detector 340 outputs to the generator 332 the generated detection information indicating that the cover-open error has been detected. The detector 340 also detects a cutter error, and based on the detection of the cutter error, generates detection information indicating that the cutter error has been detected. The detector 340 outputs to the generator 332 the generated detection information indicating that the cutter error has been detected. The detector 340 also detects a hardware error, and based on the detection of the hardware error, generates detection information indicating that the hardware error has been detected. The detector 340 outputs to the generator 332 the generated detection information indicating that the hardware error has been detected. The detector 340 also detects a voltage error, and based on the detection of the voltage error, generates detection information indicating that the voltage error has been detected. The detector 340 outputs to the generator 332 the generated detection information indicating that the voltage error has been detected. The detector 340 also detects a head temperature error, and based on the detection of the head temperature error, generates detection information indicating that the head temperature error has been detected. The detector 340 outputs to the generator 332 the generated detection information indicating that the head temperature error has been detected. The detector 340 also detects that the output buffer is full, and based on the detection that the output buffer is full, generates detection information indicating that the output buffer has been detected as being full. The detector 340 outputs to the generator 332 the generated detection information indicating that the output buffer has been detected as being full.

Figure 3:
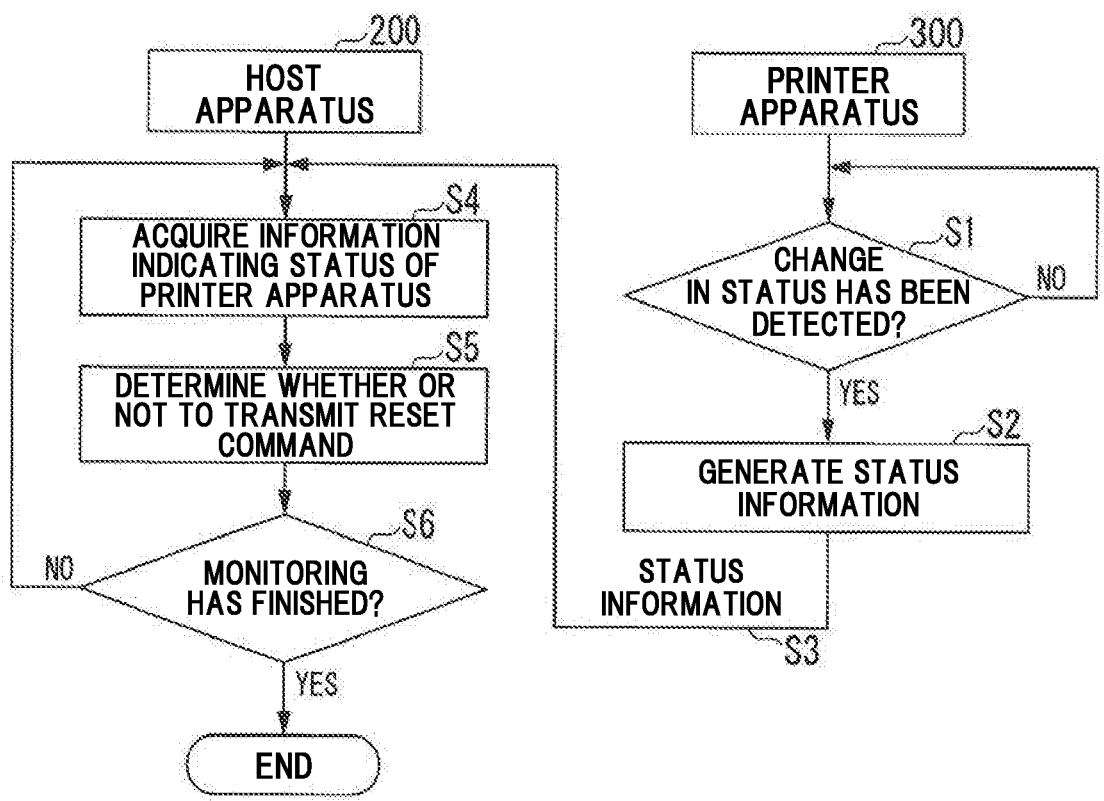
FIG. 3 is a flow chart (sequence chart) for illustrating an example of operation of the printing system according to at least one embodiment.

Operation of the printing system 100 is now described with reference to FIG. 3 to FIG. 5. FIG. 3 is a flow chart (sequence chart) for illustrating an example of operation of the printing system according to at least one embodiment. Processing in which the host apparatus 200 monitors the printer apparatus 300 is described with reference to FIG. 3. The printing system 100 executes the sequence illustrated in FIG. 3 during operation.

(Step S1) The generator 332 of the printer apparatus 300 determines whether or not a change has been detected in the status of the printer apparatus 300 based on whether or not detection information output by the detector 340 has been acquired. When the generator 332 has not acquired detection information, this means that a change has not been detected in the status of the printer apparatus 300, and hence the processing remains executing Step S1.

(Step S2) When the generator 332 has acquired detection information, information indicating the status of the printer apparatus 300 is generated based on the acquired detection information, and status information containing the created information indicating the status of the printer apparatus 300 is generated.

(Step S3) The generator 332 outputs the generated status information to the communicator 305. The communicator 305 acquires the status information output by the generator 332, and transmits the acquired status information to the host apparatus 200.

(Step S4) The communicator 205 of the host apparatus 200 receives the status information transmitted by the printer apparatus 300, and outputs the received status information to the information processor 230. The receiver 231 of the information processor 230 acquires the status information output by the communicator 205, and acquires the information indicating the status of the printer apparatus 300 included in the acquired status information. The receiver 231 outputs the acquired information indicating the status of the printer apparatus 300 to the monitor 232.

(Step S5) The monitor 232 acquires the information indicating the status of the printer apparatus 300, which is output by the receiver 231, and monitors whether or not the printer apparatus 300 is printing based on the acquired information indicating the status of the printer apparatus 300. The monitor 232 also determines whether or not the printer apparatus 300 is unable to continue printing based on information indicating the status of the printer apparatus 300. Specifically, the monitor 232 determines whether a manually recoverable error or an automatically recoverable error has occurred in the printer apparatus 300 based on the information indicating the status of the printer apparatus 300. The monitor 232 also determines whether or not an unrecoverable error has occurred in the printer apparatus 300 based on the information indicating the status of the printer apparatus 300. The monitor 232 outputs to the determiner 233 any of information indicating whether or not the printer apparatus 300 is printing, information indicating whether or not the printer apparatus 300 is unable to continue printing, and information indicating whether or not an unrecoverable error has occurred in the printer apparatus 300. The determiner 233 acquires any of the information indicating whether or not the printer apparatus 300 is printing, the information indicating whether or not the printer apparatus 300 is unable to continue printing, and the information indicating whether or not an unrecoverable error has occurred in the printer apparatus 300, which are output by the monitor 232, and determines whether or not the reset command is to be generated based on any of the information indicating whether or not the printer apparatus 300 is printing, the information indicating whether or not the printer apparatus 300 is unable to continue printing, and the information indicating whether or not an unrecoverable error has occurred in the printer apparatus 300.

(Step S6) The monitor 232 determines whether or not the monitoring has ended by determining whether or not the information indicating the status of the printer apparatus 300, which is output by the receiver 231, has been acquired.

The monitor 232 finishes when it is determined that the monitoring has finished, and when it is determined that the monitoring has not finished, the processing returns to Step S4.

Figure 4:
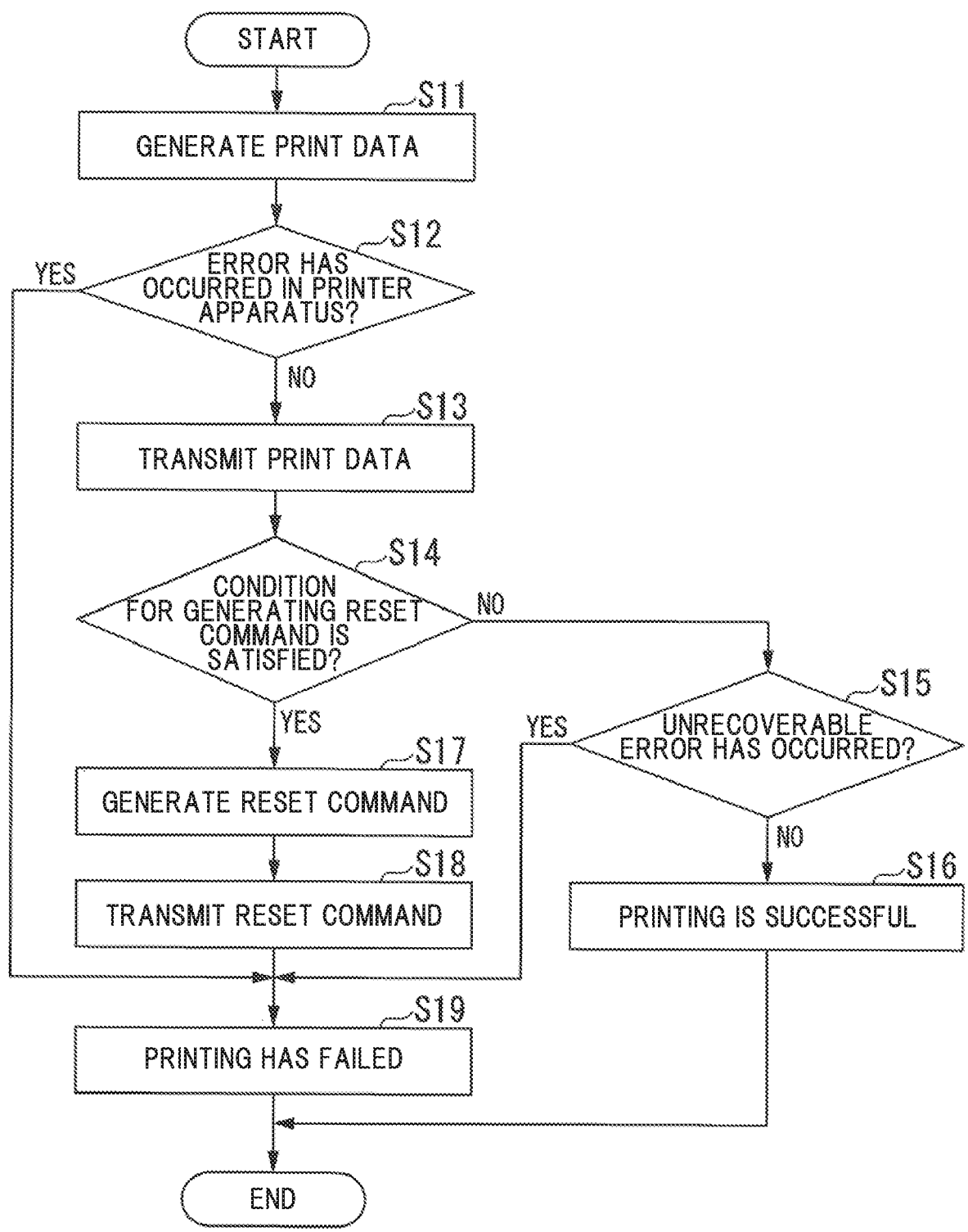
FIG. 4 is a flow chart for illustrating an example of operation of a host apparatus of the printing system according to at least one embodiment.

FIG. 4 is a sequence chart for illustrating an example of operation of the host apparatus of the printing system according to at least one embodiment.

(Step S11) The generator 234 of the host apparatus 200 generates print data.

(Step S12) The determiner 233 of the host apparatus 200 determines whether or not an error has occurred in the printer apparatus 300 by determining whether or not information indicating that the printer apparatus 300 is unable to continue printing has been acquired.

(Step S13) When the determiner 233 of the host apparatus 200 has not acquired information indicating that the printer apparatus 300 is unable to continue printing and determines that an error has not occurred in the printer apparatus 300, the generator 234 outputs the generated print data to the communicator 205. The communicator 205 transmits to the printer apparatus 300 the print data output by the generator 234.

(Step S14) When the determiner 233 of the host apparatus 200 has acquired any of the information indicating whether or not the printer apparatus 300 is printing, the information indicating whether or not the printer apparatus 300 is unable to continue printing, and the information indicating whether or not an unrecoverable error has occurred in the printer apparatus 300, which are output by the monitor 232, the determiner 233 of the host apparatus 200 determines whether or not a condition for generating the reset command is satisfied based on the acquired any of the information indicating whether or not the printer apparatus 300 is printing, the information indicating whether or not the printer apparatus 300 is unable to continue printing, and the information indicating whether or not an unrecoverable error has occurred in the printer apparatus 300. More specifically, when the determiner 233 acquires information indicating that the printer apparatus 300 is printing and acquires information indicating that a manually recoverable error has occurred in the printer apparatus 300, the condition for generating the reset command is satisfied.

(Step S15) When it is determined that the condition for generating the reset command is not satisfied, the determiner 233 determines whether or not an unrecoverable error has occurred in the printer apparatus 300 depending on whether or not information indicating whether or not an unrecoverable error has occurred in the printer apparatus 300 has been acquired.

Specifically, when the determiner 233 acquires information indicating that the printer apparatus 300 is printing and acquires information indicating that an automatically recoverable error has occurred in the printer apparatus 300, the determiner 233 determines that the condition for generating the reset command is not satisfied, and determines whether or not an unrecoverable error has occurred in the apparatus 300. When the determiner 233 acquires information indicating that the printer apparatus 300 is printing and acquires information indicating that an unrecoverable error has occurred in the printer apparatus 300, the determiner 233 determines that the condition for generating the reset command is not satisfied, and determines whether or not an unrecoverable error has occurred in the apparatus 300. When the determiner 233 acquires information indicating that the printer apparatus 300 is printing, but has not acquired any of information indicating whether a manually recoverable error or an automatically recoverable error has occurred in the printer apparatus 300 and information indicating whether or not an unrecoverable error has occurred in the printer apparatus 300, the determiner 233 determines that the condition for generating the reset command is not satisfied, and determines whether or not an unrecoverable error has occurred in the apparatus 300. When the determiner 233 acquires information indicating that the printer apparatus 300 is not printing and acquires information indicating that a manually recoverable error has occurred in the printer apparatus 300, the determiner 233 determines that the condition for generating the reset command is not satisfied, and determines whether or not an unrecoverable error has occurred in the apparatus 300. When the determiner 233 acquires information indicating that the printer apparatus 300 is not printing and acquires information indicating that an automatically recoverable error has occurred in the printer apparatus 300, the determiner 233 determines that the condition for generating the reset command is not satisfied, and determines whether or not an unrecoverable error has occurred in the apparatus 300. When the determiner 233 acquires information indicating that the printer apparatus 300 is not printing and acquires information indicating that an unrecoverable error has occurred in the printer apparatus 300, the determiner 233 determines that the condition for generating the reset command is not satisfied, and determines whether or not an unrecoverable error has occurred in the apparatus 300. When the determiner 233 acquires information indicating that the printer apparatus 300 is not printing, but has not acquired any of information indicating whether a manually recoverable error or an automatically recoverable error has occurred in the printer apparatus 300 and information indicating whether or not an unrecoverable error has occurred in the printer apparatus 300, the determiner 233 determines that the condition for generating the reset command is not satisfied, and determines whether or not an unrecoverable error has occurred in the apparatus 300.

(Step S16) When the determiner 233 determines that an unrecoverable error has not occurred in the printer apparatus 300, the generator 234 determines that printing is successful.

(Step S17) When the determiner 233 determines that the condition for generating the reset command is satisfied, the generator 234 generates the reset command. Specifically, when the determiner 233 acquires information indicating that the printer apparatus 300 is printing and acquires information indicating that a manually recoverable error has occurred in the printer apparatus 300, the determiner 233 determines that the condition for generating the reset command is satisfied, and outputs to the generator 234 information indicating that the condition for generating the reset command is satisfied. The generator 234 generates the reset command when the information output by the determiner 233 indicating that the condition for generating the reset command is satisfied is acquired.

(Step S18) The generator 234 outputs the generated reset command to the communicator 205. The communicator 205 transmits to the printer apparatus 300 the reset command output by the generator 234.

(Step S19) The determiner 233 determines that printing has failed when it is determined in Step S12 by the determiner 233 of the host apparatus 200 that an error has occurred in the printer apparatus 300 based on the acquisition of any of information indicating whether a manually recoverable error or an automatically recoverable error has occurred in the printer apparatus 300 and information indicating whether or not an unrecoverable error has occurred in the printer apparatus 300, when it is determined in Step S18 that the reset command has been generated, and when it is determined in Step S15 by the determiner 233 that an unrecoverable error has occurred in the printer apparatus 300.

Figure 5:
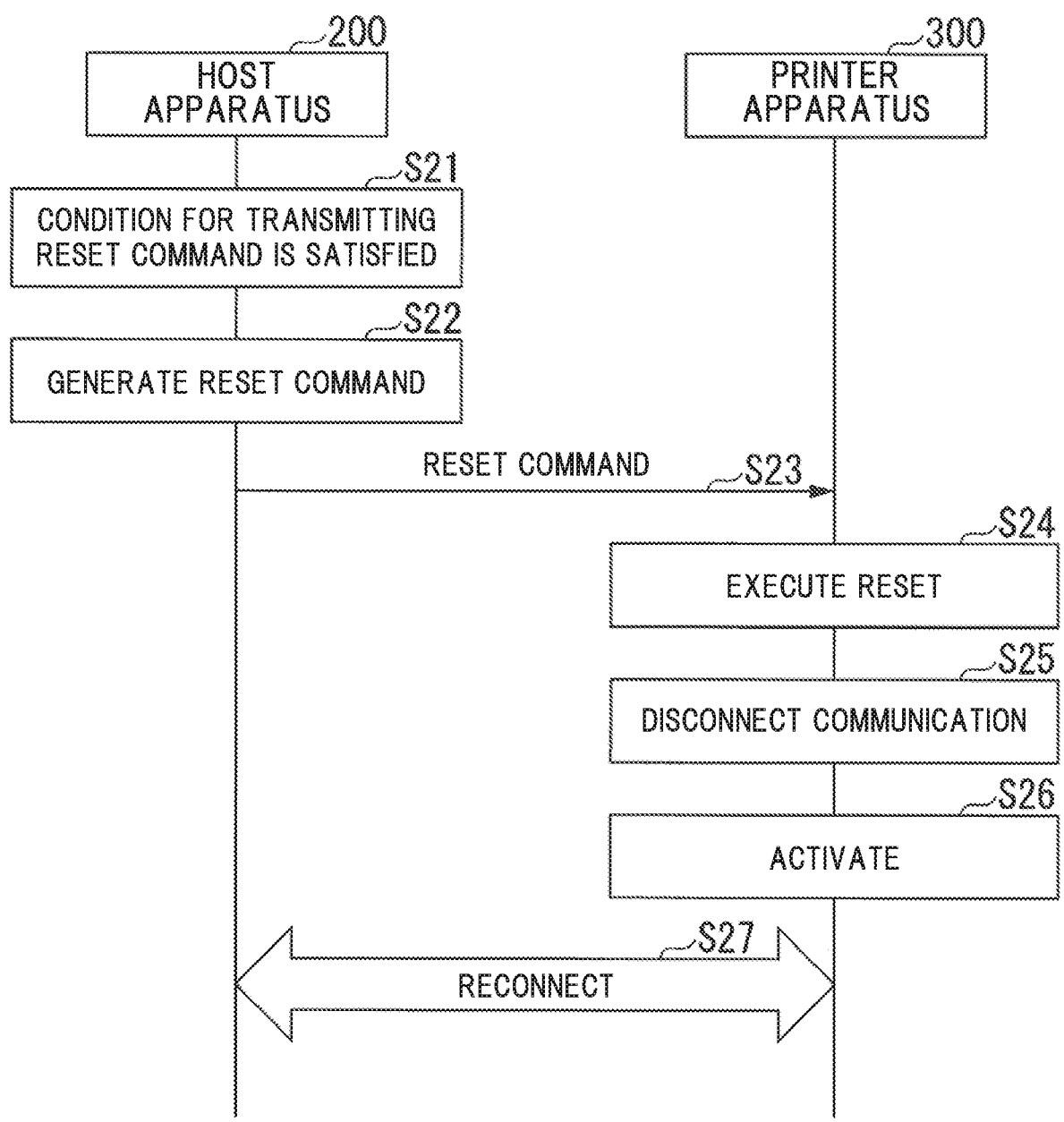
FIG. 5 is a sequence chart for illustrating an example of operation of the printing system according to at least one embodiment.

FIG. 5 is a sequence chart for illustrating an example of operation of the printing system according to at least one embodiment. Processing to be performed when the host apparatus 200 transmits the reset command to the printer apparatus 300 is now described with reference to FIG. 5.

(Step S21) When the determiner 233 of the host apparatus 200 has acquired any of the information indicating whether or not the printer apparatus 300 is printing, the information indicating whether or not the printer apparatus 300 is unable to continue printing, and the information indicating whether or not an unrecoverable error has occurred in the printer apparatus 300, which are output by the monitor 232, the determiner 233 of the host apparatus 200 determines whether or not the condition for generating the reset command is satisfied based on the acquired any of the information indicating whether or not the printer apparatus 300 is printing, the information indicating whether or not the printer apparatus 300 is unable to continue printing, and the information indicating whether or not an unrecoverable error has occurred in the printer apparatus 300. In this example, there is described below a case in which the condition for generating the reset command is satisfied.

(Step S22) The generator 234 generates the reset command.

(Step S23) The generator 234 outputs the generated reset command to the communicator 205. The communicator 205 transmits to the printer apparatus 300 the reset command output by the generator 234.

(Step S24) The communicator 305 of the printer apparatus 300 receives the reset command transmitted by the host apparatus 200, and outputs the received reset command to the information processor 330. The receiver 331 of the information processor 330 acquires the reset command output by the communicator 205, and outputs the acquired reset command to the processor 333. The processor 333 acquires the reset command output by the receiver 331, and performs processing based on the acquired reset command. The processor 333 resets (restarts) the printer apparatus 300 based on the reset command output by the receiver 331.

(Step S25) The processor 333 disconnects the communication line between the communicator 305 of the printer apparatus 300 and the host apparatus 200.

(Step S26) The processor 333 activates the printer apparatus 300.

(Step S27) The processor 333 performs processing of connecting the communicator 305 of the printer apparatus 300 to the host apparatus 200.

In the above-mentioned at least one embodiment, an out-of-paper error, a cover-open error, a cutter error, a hardware error, a voltage error, a head temperature error, and output buffer full are described as examples of the information indicating the status of the printer apparatus 300. However, the present invention is not limited to those examples. For example, errors other than those described above may be included. In the above-mentioned at least one embodiment, there is described a case in which the host apparatus 200 continues to transmit print data without confirming whether the printer apparatus 300 has completed printing. However, the present invention is not limited thereto. For example, the present invention may also be applied to a case in which the host apparatus 200 confirms whether or not the printer apparatus 300 has completed printing. In this case, the host apparatus 200 may temporarily store the print data transmitted to the printer apparatus 300, and delete the temporarily stored print data when information indicating that the printing transmitted by the printer apparatus 300 is complete is received. With this configuration, the host apparatus 200 can eliminate printing omission because print data that has not yet been printed can be retransmitted. As another example, the present invention may be applied to a case in which the host apparatus 200 transmits information for instructing printing after the print data is transmitted. In the at least one embodiment described above, as the printer apparatus 300, a thermal printer, an inkjet method, and a laser printer can be adopted, for example. In the printing system 100 of at least one embodiment, the host apparatus 200 determines whether or not the printer apparatus 300 is required to be reset without an operation by the operator. For this reason, the operation burden on the operator can be reduced. The host apparatus 200 can be configured not to transmit the reset command when the printer apparatus 300 is not printing and the printer apparatus 300 is unable to continue printing. In the related art, due to the fact that the printer apparatus is not printing, the reset command has been issued in cases in which the printer apparatus 300 is unable to continue printing even when print data is not stored in the buffer. In the printing system 100 according to at least one embodiment, because the printer apparatus 300 is not printing, when print data is not stored in the buffer, the reset command is not issued even when the printer apparatus 300 is unable to continue printing due to the occurrence of any of a manually recoverable error, an automatically recoverable error, and an unrecoverable error in the printer apparatus 300. With this configuration, it is possible to prevent unnecessary resets of the printer apparatus 300. Further, unnecessary resets are not performed, and hence the time during which printing cannot be performed can be shortened. In particular, in a case in which the host apparatus 200 and the printer apparatus 300 are connected to each other by a wireless technology such as wireless LAN (trademark) or Bluetooth (trademark), when the communication is cut off by a reset of the printer apparatus 300, reconnecting takes time. However, with the configuration described above, the time required for reconnecting can be reduced. In addition, resetting the printer apparatus 300 affects the life of the buffer. However, with the configuration described above, unnecessary resets are not performed, and hence the effect on the life of the buffer can be reduced.

Modification Example

Figure 6:
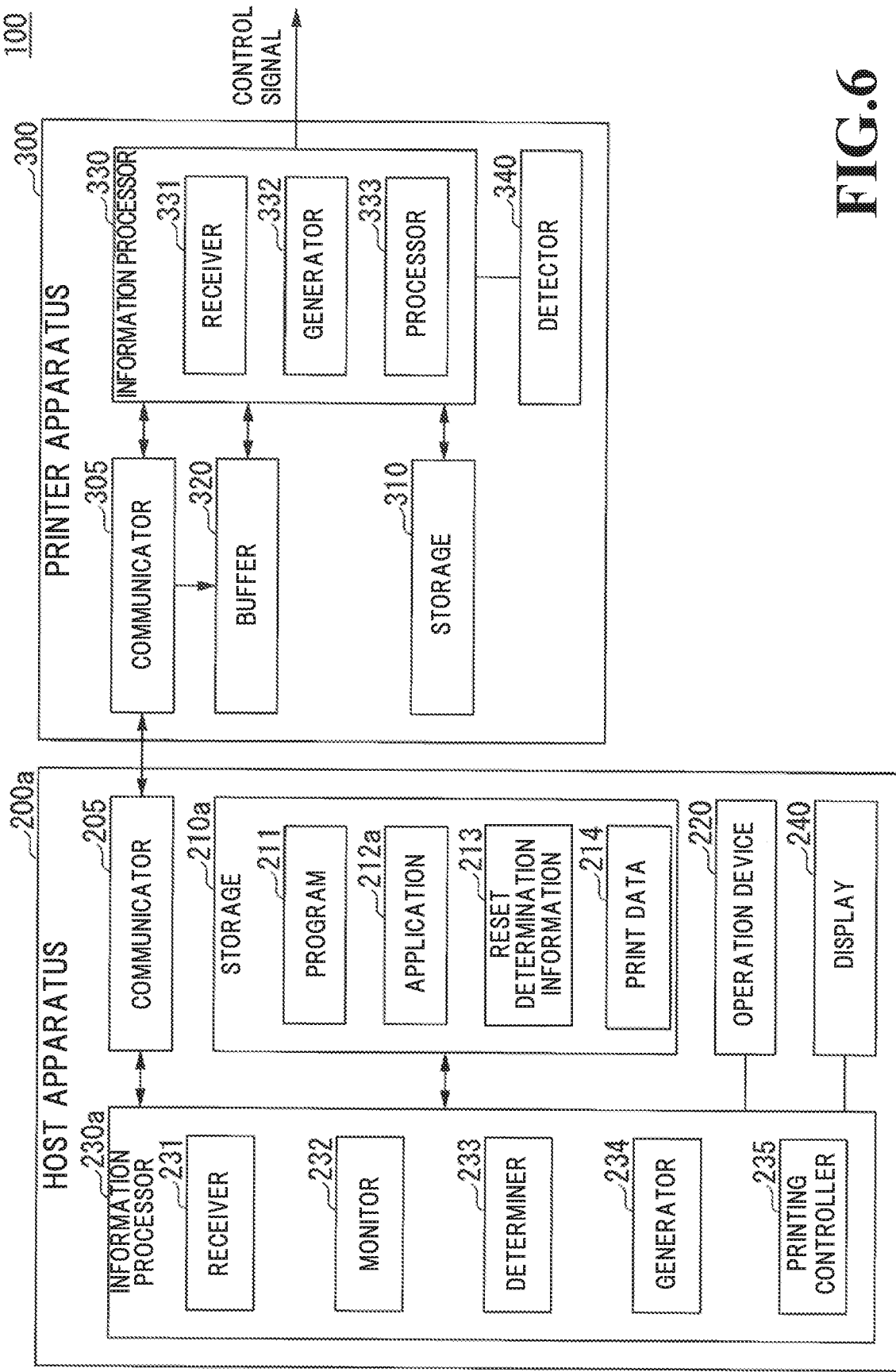
FIG. 6 is a block diagram for illustrating an example of a configuration of a printing system according to a modification example of at least one embodiment of the present invention.

There is now described a modification example of at least one embodiment of the present invention with reference to the drawings. FIG. 6 is a block diagram for illustrating an example of the configuration of the printing system according to a modification example of at least one embodiment. As illustrated in FIG. 6, the printing system 100 includes a host apparatus 200a configured to transmit a command to the printer apparatus 300, and a printer apparatus 300 configured to receive the command transmitted by the host apparatus 200a to perform processing based on the received command. The command may be, for example, a reset command for resetting (restarting) the printer apparatus 300 after the printer apparatus 300 receives the command. The host apparatus 200a is different from the host apparatus 200 in that the transmission data transmitted to the printer apparatus 300 is held until the processing of the transmission data transmitted to the printer apparatus 300 finishes. When the reset printer apparatus 300 has recovered, of the held print data, the host apparatus 200a transmits print data to the printer apparatus 300 in order from the oldest print data.

The host apparatus 200a includes a communicator 205, a storage 210a, an operation device 220, an information processor 230a, and a display 240. The communicator 205 is configured to receive printing finish notification information, which is information for notifying that the printing transmitted by the printer apparatus 300 has finished, and to output the received printing finish notification information to the information processor 230a.

The storage 210a is implemented by, for example, a RAM, a ROM, an HDD, a flash memory, or a hybrid storage device in which a plurality of those are combined. The storage 210a is configured to store a program 211 and an application 212a to be executed by the information processor 230a. The storage 210a also stores reset determination information 213 and print data 214. The application 212a is configured to cause the host apparatus 200a to execute the following functions in addition to the above-mentioned functions that the application 212 causes the host apparatus 200 to execute. The application 212a causes the host apparatus 200a to generate print data identification information, and supplement the print data with the generated print data identification information. The application 212a causes the host apparatus 200a to store the print data supplemented with the print data identification information (hereinafter referred to as "identification-information-supplemented print data"). The application 212a causes the host apparatus 200a to generate an identification number, such as information indicating the acquisition date and time of the identification-information-supplemented print data and a series of specific numbers. The application 212a causes the host apparatus 200a to store the generated identification number in association with the stored identification-information-supplemented print data. The application 212a causes the host apparatus 200a to receive the printing finish notification information transmitted by the printer apparatus 300, and acquire the print data identification information included in the received print finish notification information. The application 212a causes the host apparatus 200a to delete, based on the acquired print data identification information, of the stored identification-information-supplemented print data, the identification-information-supplemented print data including the print data identification information and the identification number stored in association with that identification-information-supplemented print data. When the printer apparatus 300 has recovered after the reset command is transmitted, the application 212a causes the host apparatus 200a to transmit, of the stored identification-information-supplemented print data, to the printer apparatus 300 the identification-information-supplemented print data in order from the identification-information-supplemented print data stored earliest, based on the identification number. The print data 214 temporarily stores the identification-information-supplemented print data generated by the information processor 230a in association with the identification number.

All or a part of the information processor 230a is a software function unit implemented by, for example, a processor such as a CPU executing the program 211 and the application 212a stored in the storage 210a. All or a part of the information processor 230 may also be implemented by hardware such as an LSI device, an ASIC, or an FPGA, or may be implemented by a combination of the software function unit and the hardware. The information processor 230a includes, for example, the receiver 231, the monitor 232, the determiner 233, the generator 234, and a printing controller 235.

The generator 234 is configured to generate print data and to generate print data identification information. The generator 234 generates the identification-information-supplemented print data by supplementing the print data with the generated print data identification information. The generator 234 outputs the generated identification-information-supplemented print data to the printing controller 235. When the generated reset command is output to the communicator 205, the generator 234 notifies the printing controller 235 of information indicating that the reset command has been output to the communicator 205. When the identification-information-supplemented print data output by the generator 234 is acquired, the printing controller 235 generates an identification number such as information indicating the acquisition date and time of the identification-information-supplemented print data and a series of specific numbers. The printing controller 235 stores the generated identification number and the identification-information-supplemented print data in association with each other in the print data 214 of the storage 210a. The printing controller 235 acquires printing finish notification information output by the communicator 205, and acquires the print data identification information included in the acquired printing finish notification information. The printing controller 235 deletes the identification-information-supplemented print data including the acquired print data identification information and the identification number stored in association with that identification-information-supplemented print data, from the print data 214 of the storage 210a. The printing controller 235 acquires information indicating that the reset command output by the generator 234 has been output to the communicator 205. The printing controller 235 acquires, based on the information indicating that the acquired reset command has been output to the communicator 205, among the identification numbers held in the print data 214 of the storage 210a, the identification-information-supplemented print data stored in the print data 214 of the storage 210a in association with an identification number for a long period of time from its acquisition date and time from the print data 214 of the storage 210a, and outputs the acquired identification-information-supplemented print data to the communicator 205.

Figure 7:
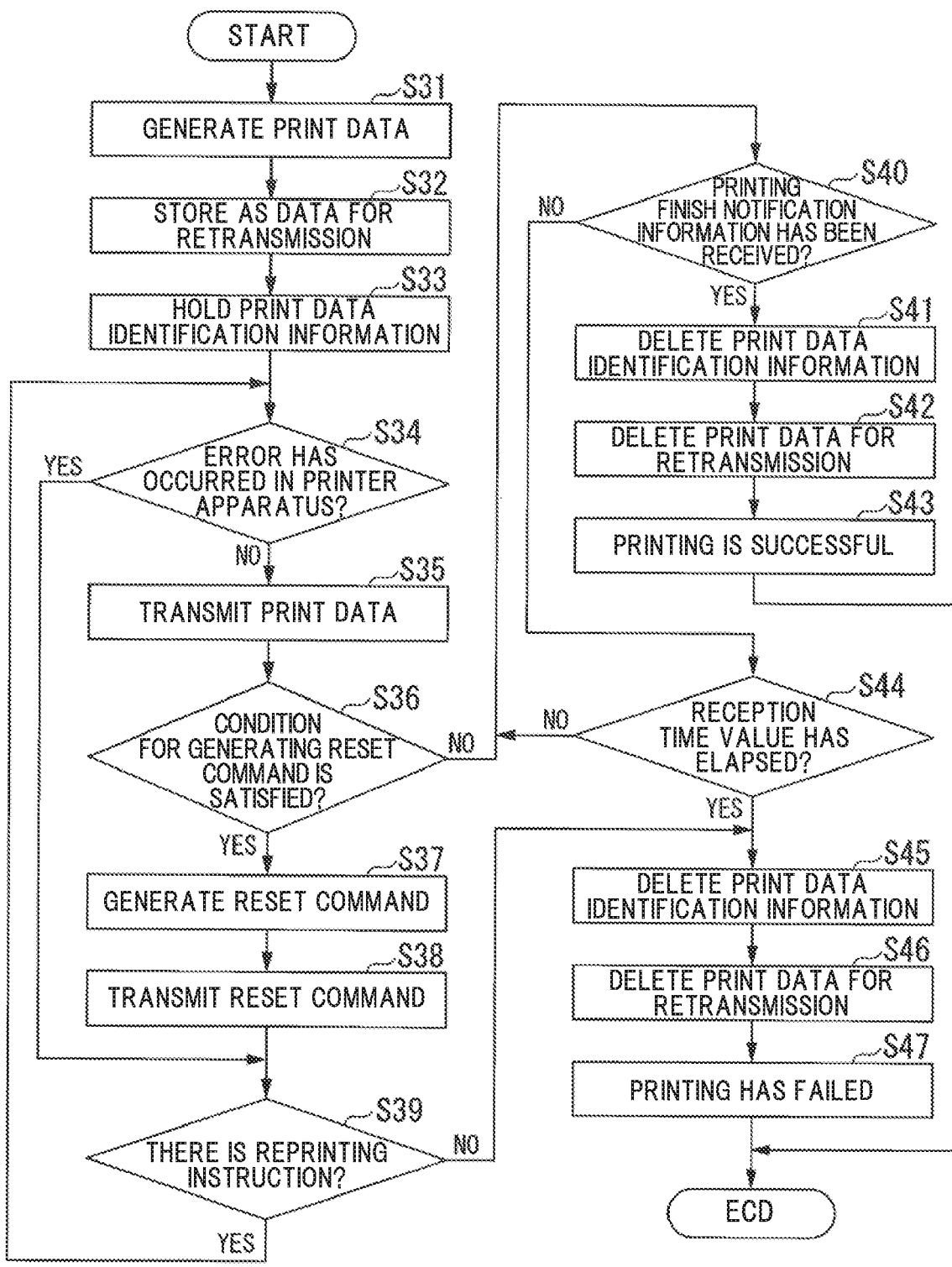
FIG. 7 is a flow chart for illustrating an example of operation of the host apparatus of the printing system according to the modification example of at least one embodiment.

Operation of the printing system 100 is now described with reference to FIG. 7 to FIG. 8. FIG. 7 is a flow chart (sequence chart) for illustrating an example of operation of the host apparatus of the printing system according to a modification example of at least one embodiment. Processing in which the host apparatus 200a monitors the printer apparatus 300 is described with reference to FIG. 7. The printing system 100 executes the sequence illustrated in FIG. 7 during operation.

(Step S31) The generator 234 of the host apparatus 200 generates print data.

(Step S32) The generator 234 generates identification information on the print data generated in Step S31. The generator 234 outputs to the printing controller 235 identification-information-supplemented print data generated by supplementing the print data with the print data identification information. For example, the generator 234 supplements the print data identification information at a suitable position of the print data, for example, at the end. The printing controller 235 acquires the identification-information-supplemented print data output by the generator 234, and stores the acquired identification-information-supplemented print data in the print data 214 of the storage 210a.

(Step S33) When the identification-information-supplemented print data output by the generator 234 is acquired, the printing controller 235 generates an identification number, such as information indicating the acquisition date and time of the identification-information-supplemented print data and a series of specific numbers. The printing controller 235 stores the generated identification number in association with the identification-information-supplemented print data stored in the storage 210a in Step S32.

(Step S34) The determiner 233 determines whether or not an error has occurred in the printer apparatus 300 by determining whether or not information indicating that the printer apparatus 300 is unable to continue printing has been acquired.

(Step S35) When the determiner 233 of the host apparatus 200 has not acquired information indicating that the printer apparatus 300 is unable to continue printing and therefore determines that an error has not occurred in the printer apparatus 300, the generator 234 outputs the identification-information-supplemented print data to the communicator 205. The communicator 205 transmits to the printer apparatus 300 the identification-information-supplemented print data output by the generator 234.

(Step S36) When the determiner 233 has acquired any of the information indicating whether or not the printer apparatus 300 is printing, the information indicating whether or not the printer apparatus 300 is unable to continue printing, and the information indicating whether or not an unrecoverable error has occurred in the printer apparatus 300, which are output by the monitor 232, the determiner 233 determines whether or not the reset command is to be generated based on any of the information indicating whether or not the printer apparatus 300 is printing, the information indicating whether or not the printer apparatus 300 is unable to continue printing, and the information indicating whether or not an unrecoverable error has occurred in the printer apparatus 300. More specifically, when the determiner 233 acquires information indicating that the printer apparatus 300 is printing and information indicating that a manually recoverable error has occurred in the printer apparatus 300, the condition for generating the reset command is satisfied.

(Step S37) When the determiner 233 determines that the condition for generating the reset command is satisfied, the generator 234 generates the reset command. Specifically, when the determiner 233 acquires information indicating that the printer apparatus 300 is printing and information indicating that a manually recoverable error has occurred in the printer apparatus 300, the determiner 233 determines that the condition for generating the reset command is satisfied, and outputs to the generator 234 information indicating that the condition for generating the reset command is satisfied. The generator 234 generates the reset command when the information indicating that the condition for generating the reset command is satisfied, which is output by the determiner 233, is acquired.

(Step S38) The generator 234 outputs the generated reset command to the communicator 205. The communicator 205 transmits to the printer apparatus 300 the reset command output by the generator 234.

(Step S39) When it is determined in Step S34 that an error has occurred in the printer apparatus 300, and when it is determined in Step S38 that the reset command has been transmitted, the generator 234 determines whether or not there is a reprinting instruction. When it is determined that there is a reprinting instruction, the processing returns to Step S34.

(Step S40) When the determiner 233 determines in Step S36 that the condition for generating the reset command is not satisfied, the printing controller 235 determines whether or not printing finish notification information output by the communicator 205 has been acquired. Specifically, the printing controller acquires identification information from the printer apparatus 300, and determines that the acquired identification information matches the print data identification information supplemented to the identification-information-supplemented print data stored in the print data 214 of the storage 210a.

(Step S41) When the printing controller 235 determines that the printing finish notification information has been acquired, the printing controller 235 deletes the relevant print data identification information from among the print data identification information supplemented to the identification-information-supplemented print data stored in the print data 214 of the storage 210a.

(Step S42) The printing controller 235 deletes the print data and the identification number corresponding to the deleted print data identification information.

(Step S43) The printing controller 235 determines that printing is successful.

(Step S44) When the printing controller 235 determines that the printing finish notification information has not been acquired, the printing controller 235 determines whether or not a reception time threshold value has elapsed. The reception time threshold value is a threshold value of the time required by the printing apparatus 300 to perform print processing after the host apparatus 200a transmits the identification-information-supplemented print data to the printing apparatus 300. When the reception time threshold value has not elapsed, the processing returns to Step S40.

(Step S45) When it is determined by the printing controller 235 in Step S44 that the reception time threshold value has elapsed, and when it is determined by the generator 234 in Step S39 that there is no reprinting instruction, the printing controller 235 deletes the relevant print data identification information from among pieces of print data identification information supplemented to the identification-information-supplemented print data stored in the print data 214 of the storage 210a.

(Step S46) The printing controller 235 deletes the print data and the identification number corresponding to the deleted print data identification information.

(Step S47) The printing controller 235 determines that printing has failed.

In the flow chart illustrated in FIG. 7, the order of Step S41 and Step S42 may be interchanged, and the order of Step S45 and Step S46 may also be interchanged.

Figure 8:
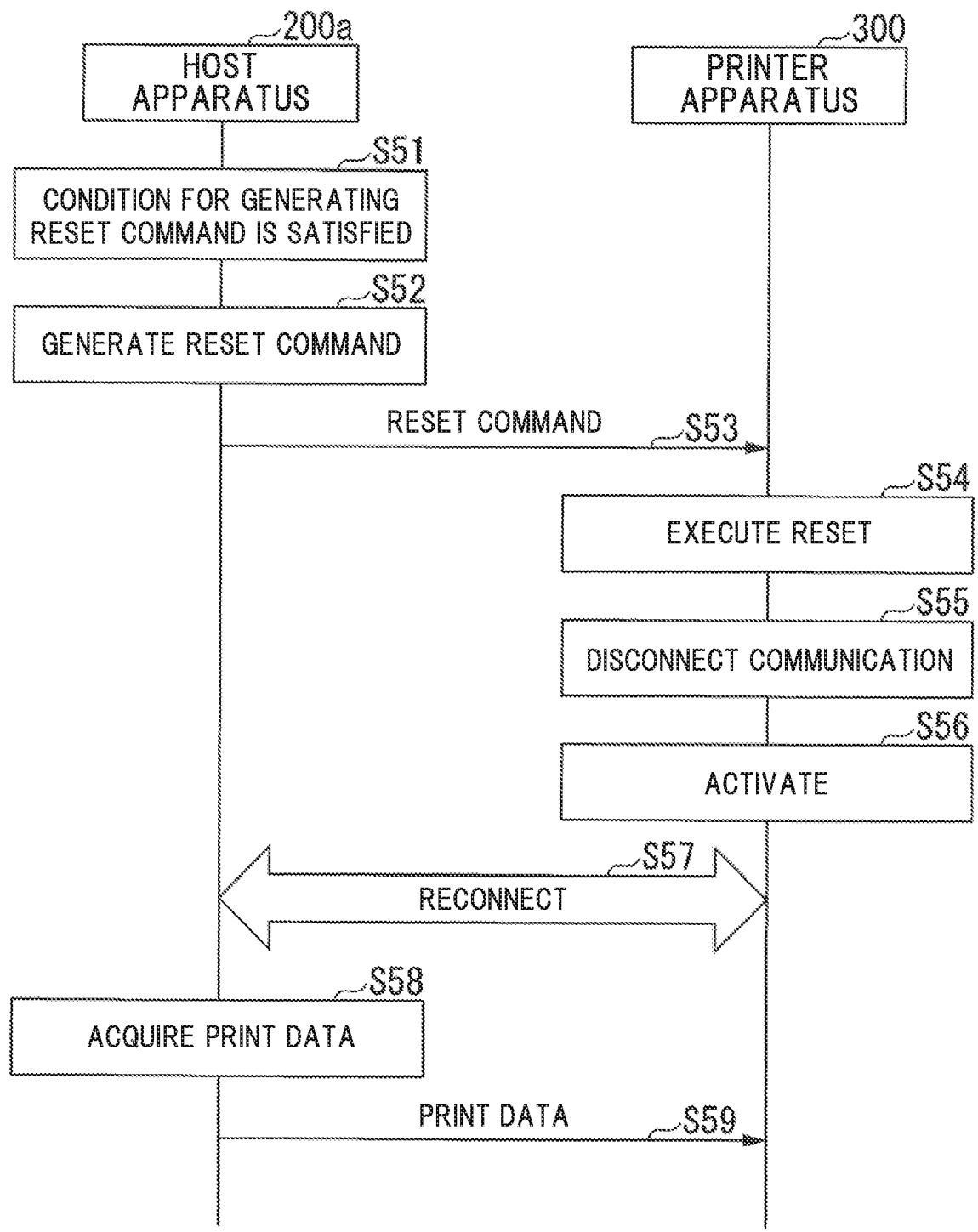
FIG. 8 is a sequence chart for illustrating an example of operation of the printing system according to the modification example of at least one embodiment.

FIG. 8 is a sequence chart for illustrating an example of operation of the printing system according to the modification example of at least one embodiment. There is now described with reference to FIG. 8 the processing to be executed when the host apparatus 200a transmits the reset command to the printer apparatus 300. Step S21 to Step S27 can be applied to Step S51 to Step S57 of FIG. 5.

(Step S58) The printing controller 235 of the host apparatus 200a acquires, based on the identification number supplemented to the identification-information-supplemented print data stored in the print data 214 of the storage 210a, from the print data 214 of the storage 210a the identification-information-supplemented print data associated with an identification number for which a long period time from the acquisition date and time has elapsed, and outputs the acquired identification-information-supplemented print data to the communicator 205.

(Step S59) The communicator 205 acquires the identification-information-supplemented print data output by the printing controller 235, and transmits the acquired identification-information-supplemented print data to the printer apparatus 300.

In the above-mentioned modification example of at least one embodiment, there is described a case in which, when the printer apparatus 300 has recovered as a result of the host apparatus 200a transmitting the reset command to the printer apparatus 300, the host apparatus 200a causes the printer apparatus 300 to transmit, of the stored identification-information-supplemented print data, the identification-information-supplemented print data in order from the identification-information-supplemented print data stored earliest. However, the present invention is not limited to this example. For example, the identification-information-supplemented print data may be transmitted in a suitable order other than the ascending order in which the identification-information-supplemented print data is stored, or the transmission order may be set by the operator. In the printing system 100 according to the modification example of at least one embodiment, the host apparatus 200a generates print data and print data identification information. The host apparatus 200a generates identification-information-supplemented print data by supplementing the print data with the generated print data identification information. The host apparatus 200a generates an identification number, such as information indicating the acquisition date and time of identification-information-supplemented print data and a series of specific numbers. The host apparatus 200a stores the generated identification number in association with the identification-information-supplemented print data. When the host apparatus 200a receives a printing finish notification information transmitted by the printer apparatus 300, the host apparatus 200a acquires the print data identification information included in the printing finish notification information. The host apparatus 200a deletes the identification-information-supplemented print data including the acquired print data identification information and the identification number stored in association with that identification-information-supplemented print data. With this configuration, the host apparatus 200a can grasp whether or not the identification-information-supplemented print data has been processed. Therefore, it is possible to prevent such a situation in which, even though the identification-information-supplemented print data has been transmitted to the printer apparatus 300, identification-information-supplemented print data is left unprocessed. When the host apparatus 200a does not receive printing finish notification information containing the print data identification information corresponding to the identification-information-supplemented print data even though the reception time threshold value has elapsed since transmission of the print data to the printer apparatus 300, the host apparatus 200a determines that printing has failed. Further, when the printer apparatus 300 has recovered as a result of the host apparatus 200a transmitting the reset command to the printer apparatus 300, the host apparatus 200a transmits to the printer apparatus 300 the stored identification-information-supplemented print data in ascending (earlier) order of storage. With this configuration, before the host apparatus 200a transmits the reset command, the identification-information-supplemented print data that has not been processed by the printer apparatus 300 among pieces of identification-information-supplemented print data transmitted to the printer apparatus 300 can be processed. In other words, even when identification-information-supplemented print data remaining in the buffer is deleted due to an interruption in the print processing without an operation by the operator, the deleted identification-information-supplemented print data can be processed.

All or a part of the function of each device included in the host apparatus 200, the host apparatus 200a, and the printer apparatus 300 in the above-mentioned at least one embodiment may also be implemented by recording a program for implementing those functions in a computer-readable recording medium, and reading and executing the program recorded in the recording medium on a computer system. As used herein, the "computer system" may include an OS and hardware, for example, a peripheral device.

The term "computer-readable recording medium" refers to portable media, such as a flexible disk, a magneto-optical disc, a ROM, and a CD-ROM, or a storage included in the computer system, for example, a hard disk drive. The term "computer-readable recording medium" may also refer to a medium configured to dynamically hold a program for a short period of time, like a communication cable used when a program is transmitted via a network, for example, the Internet, or a communication line, for example, a telephone line, or to a medium configured to hold a program for a fixed period of time, like a volatile memory in a computer system serving as a server or a client in such a case. The above-mentioned program may be a program for implementing a part of the above-mentioned functions, or may be capable of implementing the above-mentioned functions in combination with a program already recorded in the computer system.

This concludes the descriptions of at least one embodiment as at least one mode for carrying out the present invention. However, the present invention is not limited to the above-mentioned at least one embodiment in any way, and various modifications and substitutions can be made within the scope that does not depart from the spirit of the present invention.

What is claimed is:

1. A printing system, comprising a host apparatus configured to transmit a command to a printer apparatus,
   the host apparatus including:
   a communicator configured to receive status information containing information indicating a status of the printer apparatus, which is transmitted by the printer apparatus;
   a monitor configured to monitor the status of the printer apparatus based on the information indicating the status of the printer apparatus, which is contained in the status information received by the communicator;
   a determiner configured to determine, based on a result of monitoring the printer apparatus by the monitor, whether a reset command to be transmitted to the printer apparatus is to be generated; and
   a generator configured to generate the reset command when the determiner determines that the reset command is to be generated,
   the communicator being configured to transmit the reset command generated by the generator to the printer apparatus,
   wherein, when the status of the printer apparatus is monitored to be printing, the determiner is configured to determine that the reset command is to be generated when the information indicating the status of the printer apparatus indicates that the printer apparatus is unable to print but is manually recoverable.

2. The printing system according to claim 1, wherein the status information contains information indicating that the printer apparatus is printing and information indicating that the printer apparatus is unable to print.

3. The printing system according to claim 2, wherein, when the monitor determines that the printer apparatus is printing, the determiner determines that the reset command is to be generated when the information indicating the status of the printer apparatus indicates that the printer apparatus is unable to print but is manually recoverable.

4. The printing system according to claim 3, wherein, when the monitor determines that the printer apparatus is not printing, the determiner determines that the reset command is not to be generated when the information indicating the status of the printer apparatus indicates that the printer apparatus is unable to print.

5. The printing system according to claim 4, further comprising:
  a storage configured to store pieces of print data to be transmitted to the printer apparatus; and
  a printing controller configured to retransmit, when the printer apparatus that has been reset based on the reset command transmitted to the printer apparatus has recovered to a printable state, among the pieces of print data stored in the storage, a piece of print data which has been transmitted to the printer apparatus and for which printing by the printer apparatus is incomplete.

6. The printing system according to claim 5, wherein the communicator is wirelessly connected to the printer apparatus.

7. The printing system according to claim 1, wherein, when the monitor determines that the printer apparatus is not printing, the determiner determines that the reset command is not to be generated when the information indicating the status of the printer apparatus indicates that the printer apparatus is unable to print.

8. The printing system according to claim 1, further comprising:
  a storage configured to store pieces of print data to be transmitted to the printer apparatus; and
  a printing controller configured to retransmit, when the printer apparatus that has been reset based on the reset command transmitted to the printer apparatus has recovered to a printable state, among the pieces of print data stored in the storage, a piece of print data which has been transmitted to the printer apparatus and for which printing by the printer apparatus is incomplete.

9. The printing system according to claim 1, wherein the communicator is wirelessly connected to the printer apparatus.

10. A host apparatus, which is configured to transmit a command to a printer apparatus, the host apparatus comprising:
  a communicator configured to receive status information containing information indicating a status of the printer apparatus, which is transmitted by the printer apparatus;
  a monitor configured to monitor the status of the printer apparatus based on the information indicating the status of the printer apparatus, which is included in the status information received by the communicator;
  a determiner configured to determine, based on a result of monitoring the printer apparatus by the monitor, whether a reset command to be transmitted to the printer apparatus is to be generated; and
  a generator configured to generate the reset command when the determiner determines that the reset command is to be generated,
  the communicator being configured to transmit the reset command generated by the generator to the printer apparatus,
  wherein, when the status of the printer apparatus is monitored to be printing, the determiner is configured to determine that the reset command is to be generated when the information indicating the status of the printer apparatus indicates that the printer apparatus is unable to print but is manually recoverable.

11. A printing control method to be executed by a printing system including a host apparatus configured to transmit a command to a printer apparatus, the method comprising:
  receiving, by the host apparatus, status information containing information indicating a status of the printer apparatus, which is transmitted by the printer apparatus;
  monitoring, by the host apparatus, the status of the printer apparatus based on the information indicating the status of the printer apparatus;
  determining, by the host apparatus, based on a result of monitoring the printer apparatus, whether a reset command to be transmitted to the printer apparatus is to be generated;
  generating, by the host apparatus, the reset command when it is determined that the reset command is to be generated; and
  transmitting the generated reset command to the printer apparatus,
  wherein, when it is monitored that the status of the printer apparatus is printing, the determination of whether to generate the reset command includes determining to generate the reset command when the information indicating the status of the printer apparatus indicates that the printer apparatus is unable to print but is manually recoverable.

12. A non-transitory computer-readable recording medium having a program recorded thereon, the program to direct a processor to perform acts of:
  receiving, from a printer apparatus, status information containing information indicating a status of the printer apparatus;
  monitoring the status of the printer apparatus based on the information indicating the status of the printer apparatus;
  determining, based on a result of monitoring the printer apparatus, whether a reset command to be transmitted to the printer apparatus is to be generated;
  generating the reset command when it is determined that the reset command is to be generated; and
  transmitting the generated reset command to the printer apparatus,
  wherein, when it is monitored that the status of the printer apparatus is printing, the determination of whether to generate the reset command includes determining to generate the reset command when the information indicating the status of the printer apparatus indicates that the printer apparatus is unable to print but is manually recoverable.

* * * * *